No. 611,534. Patented Sept. 27, 1898.
V. D. VENABLE.
UNICYCLE.
(Application filed May 18, 1897.)
(No Model.)
Fig. 1.
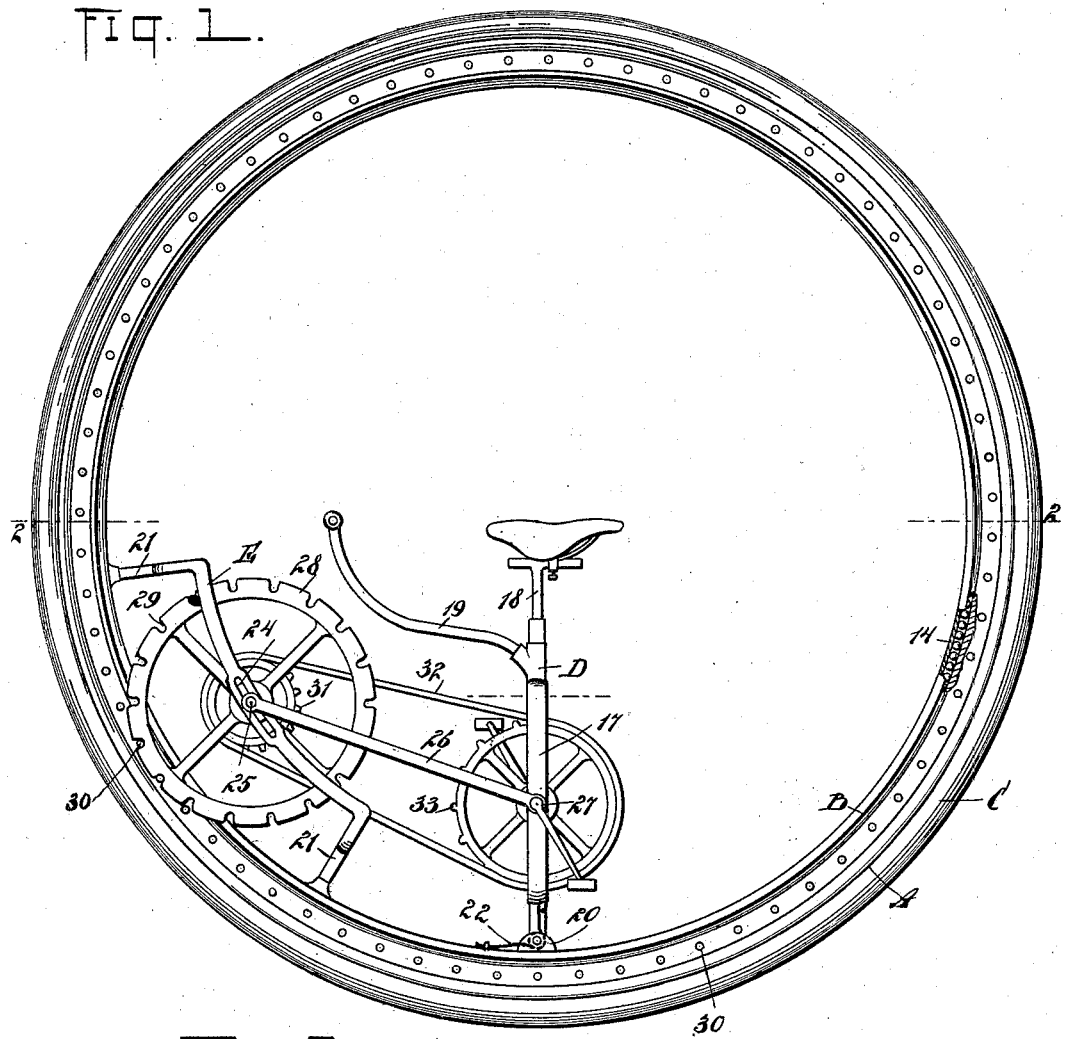
Fig. 2.
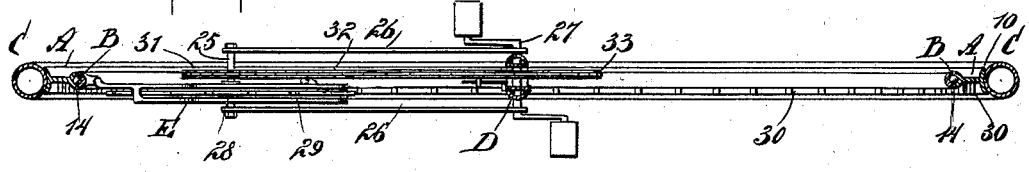
Fig. 3.
WITNESSES:
INVENTOR
V. D. Venable
BY
ATTORNEYS.

UNITED STATES PATENT OFFICE.

VERNON D. VENABLE, OF FARMVILLE, VIRGINIA.

UNICYCLE.

SPECIFICATION forming part of Letters Patent No. 611,534, dated September 27, 1898.

Application filed May 18, 1897. Serial No. 637,053. (No model.)

*To all whom it may concern:*

Be it known that I, VERNON D. VENABLE, of Farmville, in the county of Prince Edward and State of Virginia, have invented a new and Improved Unicycle, of which the following is a full, clear, and exact description.

The object of my invention is to construct a unicycle in such manner that one section of the rim will have sliding movement upon a second section, and whereby a simple form of driving mechanism will be employed, and also whereby the rider will automatically acquire the proper position within the wheel to sustain a proper balance when traveling up or down hill or upon level ground.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of the improved unicycle, a part of the wheel being broken away. Fig. 2 is a section on the line 2 2 of Fig. 1, and Fig. 3 is an enlarged transverse section through the rim and tire of the wheel.

One of the main features of the invention consists in providing a spokeless wheel and a wheel in which the rim will be in two sections, one held to turn around and upon the other, the working parts of the unicycle being secured to the innermost section of the rim.

The rim is made in two sections A and B, as shown best in Fig. 3. The section A comprises a concaved band 10, which receives a pneumatic tire C or other form of tire used, the concaved band 10 being connected by a circular or continuous web 11 with a semicircular and smaller band 12, having its inner face provided, preferably, with an angular continuous peripheral groove 13. The section B of the rim consists of a semicircular band 15, the counterpart of the band 12, the band 15 being also provided with a continuous peripheral groove 16, formed upon its outer face, and balls or rollers 14 are received within the two grooves or recesses 13 and 16. When a wheel is thus constructed, one section of the rim will turn upon the other, and friction will be reduced to a minimum by means of the interposed balls or rollers 14.

The inner portion B of the wheel is to be the stationary section, while the outer section A is to travel on the ground. The driving mechanism, as heretofore stated, is carried entirely by the inner section B. To that end an upright D is located at the lower central portion of the wheel, the central portion of the upright D being double or in the form of a loop 17. The upper end of the upright D receives the saddle-post 18, and from said upper end also a handle-bar 19 is upwardly and forwardly curved. The lower end of the upright D is pivoted between lugs or ears 20, formed upon the lower central portion of the inner or stationary rim-section B, and a double frame E, preferably curved, is placed in advance of the upright D, being attached to the inner rim-section B by means of legs 21. A spring 22, preferably a coiled spring, is attached to the upright D, being carried around the bottom of the said upright D and secured to the under section of the rim in advance of the said upright. The spring is neutral while the upright is perpendicular and at tension when the upright is carried forward or back.

A slot 24 is made in each side member of the double frame E. Through these slots a shaft 25 is loosely passed, the ends of the shaft 25 being journaled in the forward ends of links 26, the rear ends of said links receiving the end portions of a pedal-shaft 27, which is journaled in the loop portion of the upright D at or near the center of the same.

A drive-wheel 28 is secured upon the shaft 25, said drive-wheel being provided with recesses in its periphery adapted to receive pins 30, which extend horizontally from one side of the web 11 of the rim. A sprocket-pinion 31 is secured upon the shaft 25 and is connected by a belt 32 with a second and larger sprocket-wheel 33, secured on the pedal-shaft. The links 26 serve to keep the two sprocket-wheels at such a distance apart that the belt will be properly stretched.

In operation the rider is seated on the saddle and operates the pedals of the pedal-shaft in the manner usual to bicycles. The rotation of the pedal-shaft gives corresponding motion to the drive-wheel 28, which in its turn communicates movement to the outer or tire section of the wheel-rim. When the rider is ascending a hill, for example, the tendency of the drive-wheel is to move upward, and such tendency, by reason of the link connection 26 with the upright, will draw the upright at its upper end, and consequently the saddle, forwardly, throwing the weight of the rider toward the front, and a reverse action will take place when descending a hill or when back-pedaling. The wheel may be readily steered by inclining the person to the right or to the left.

Having thus described my invention, I claim as new and desire to secure by Letters Patent—

1. A unicycle having an outer and an inner rim rotatable on each other, seat-supporting and driving mechanisms mounted upon the inner ring, the seat-support being pivoted to swing in the plane of the ring and the driving mechanism being movable upon the inner rim, and connections interposed between the driving mechanism and the seat whereby the seat swings in unison with the driving mechanism.

2. A unicycle, comprising a rim or spokeless wheel composed of two parts, one sliding upon the other, a seat-support pivoted upon the inner part of the rim to swing in the plane thereof, a drive-wheel carried by the inner rim and engaging the outer and having a limited movement relative to the inner rim, supporting connections from the drive-wheel to the seat-post whereby the seat is swung forward and backward according to the action of the drive-wheel, and means for turning the said drive-wheel, substantially as described.

3. In a unicycle, a spokeless wheel constructed in two sections, the outer section being held to turn upon and around the inner section, the outer section being provided with a series of pins projected from its side, a saddle-post pivoted upon the inner section, a frame secured to the inner section, a drive-wheel adjustably mounted in said frame, having recesses to receive said projections, a pedal-shaft carried by the upright, a driving connection between the pedal-shaft and the shaft on which the driving-wheel is mounted, and a tension device normally holding the upright in a vertical position.

4. The combination, with a unicycle, the wheel whereof is spokeless and constructed of an inner section and an outer tire-section, the tire-section being mounted to turn upon and around the inner section, said tire-section being also provided with pins extending from one of its sides, of an upright pivoted to the inner section of the wheel, adapted to receive a saddle, a pedal-shaft carrying a sprocket-wheel journaled in said upright, a frame secured to the inner section of the wheel in advance of the upright, a driving-wheel adjustably mounted in the said frame and provided with peripheral recesses to receive said projections from the tire-section of the main wheel, a driving connection between the shaft of the driving-wheel and the pedal-shaft, links in which the pedal-shafts and the shaft of the driving-wheel are loosely mounted, and a spring device connected with the inner section of the main wheel, being passed beneath said upright to an attachment therewith.

VERNON D. VENABLE.

Witnesses:
CHAS. F. BUGG,
I. M. CRETTE.